United States Patent Office  3,823,112  
Patented July 9, 1974

---

3,823,112  
LIGHT STABILIZED POLYMER COMPOSITIONS AND BENZOTRIAZOLE STABILIZERS  
Fernando J. Ponder, Broadview Heights, Ohio, assignor to Ferro Corporation, Cleveland, Ohio  
No Drawing. Continuation of application Ser. No. 216,792, Jan 10, 1972, which is a continuation-in-part of application Ser. No. 846,259, July 30, 1969, both now abandoned. This application Sept. 1, 1972, Ser. No. 285,795  
Int. Cl. C08f 45/58  
U.S. Cl. 260—45.8 N   5 Claims

ABSTRACT OF THE DISCLOSURE

Benzotriazoles useful as light stabilizers of the formula:

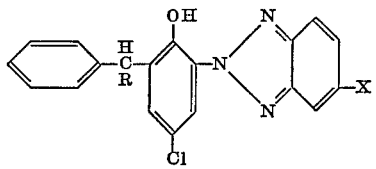

wherein R is H or methyl and X is Cl or H.

---

This is a continuation of application Ser. No. 216,792, filed Jan. 10, 1972, which in turn is a continuation-in-part of application Ser. No. 846,259, filed July 30, 1969, both abandoned.

This invention relates to light sensitive polymers stabilized with a benzotriazole and more particularly to light sensitive polymers stabilized with a benzotriazole of the formula:

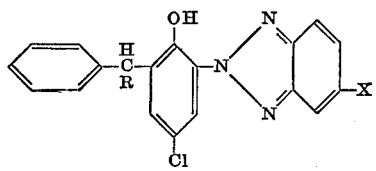

wherein R is hydrogen or methyl and X is chlorine or hydrogen. This invention also relates to novel azo intermediates of the formula:

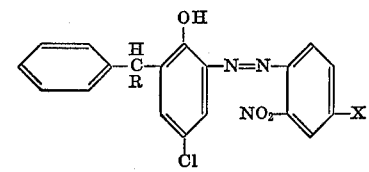

wherein R is hydrogen or methyl and X is chlorine or hydrogen.

Among the light sensitive polymers which can be stabilized the novel benzotriazoles are polystyrene and unsaturated polyester resins.

The unsaturated polyester resins are liquid mixtures of unsaturated alkyd resin having a plurality of alpha-beta ethylenically unsaturated groups and an ethylenically unsaturated monomer. Suitable liquid polyester resins are prepared by reacting polyhydric alcohols with dicarboxylic acids and acid anhydrides. Any of the conventional modifiers can also be employed, as well as the conventional cross-linking monomers.

Exemplary of suitable ethylenically unsaturated dibasic acids useful in preparing ethylenically unsaturated polyesters are maleic acid and fumaric acid. A suitable ethylenically unsaturated anhydride is maleic anhydride. Exemplary of suitable polyhydric alcohols are those having from 2 to 20 carbon atoms to include glycerol, ethylene glycol, propylene glycol, diethylene glycol, triethylene glycol, neo-pentyl glycol, butylene glycol and hydroxy nonaethoxyethanol. Exemplary of suitable modifying dibasic acids are the saturated aliphatic acids having from 6 to 10 carbon atoms to incude pimelic, azelaic, adipic, suberic, and sebacic. Exemplary of suitable aromatic modifying dibasic acids are phthalic and isophthalic. Exemplary of suitable cross-linking monomers are vinyl and allyl monomers to include styrene, methyl methacrylate, diallyl phthalate, divinylbenzene and vinyltoluene. The unsaturated polyester resins most commonly used have a viscosity of between about 3 and about 12 poises at 65° F.

The novel benzotriazoles can be prepared by coupling o-nitrobenzene diazonium compounds with benzylchlorophenols, and then reducing the resultant o-nitroazo intermediates. An example of a suitable reducing agent is zinc in an alkaline medium.

The stabilizers can be incorporated within the polymer by conventional means such as milling on hot mill rolls or mixing in a Banbury mixer or other well known devices of this nature; or the stabilizers can be blended with a molding powder and incorporated during extrusion or during injection-molding; or can be incorporated into a solution of the polymer which solution can then be employed for the formation of films; or can be fused or fluxed with the resin. The stabilizers can be added alone or they can first be dissolved in a suitable solvent as the particular mixing procedure warrants. Only a minor but effective amount need be employed such as from about 0.01% to about 10% and preferably from about 0.5% to about 5% by weight of the polymer.

The following examples will serve to illustrate the invention and its preferred embodiments.

EXAMPLE 1

Preparation of 2-(3-benzyl-5-chloro-2-hydroxyphenyl) benzotriazole and azo intermediate 69 grams (0.5 mole) of o-nitro aniline was diazotized with 250 ml. of concentrated HCl and 36 grams (0.5 mole) of sodium nitrite dissolved in 250 grams of water was added to a reaction flask, and 270 ml. of 30% sodium acetate added to the reaction mixture to obtain a pH of about 4. To the mixture were then added 109 grams (0.5 mole) of 2-benzyl-4-chlorophenol and 750 grams of methanol combined with 150 grams of 30% aqueous sodium acetate over a period of 50 minutes while maintaining the reaction temperature at 0° by means of an ice bath. A red precipitate was recovered by vacuum filtration and washed with 5% methanol until the wash water was practically colorless; 120.3 grams (65.5% yield) of 3-benzyl-5-chloro-2-hydroxy-2'-nitro azobenzene was recovered. After dispersing 119 grams (0.3 mole) of this red azo intermediate in 600 grams of a 20% solution of sodium hydroxide in 1:1 v./v. aqueous methanol, 83 grams of 97% zinc dust was added over a period of 15 minutes, while the temperature was maintained between 25 and 35° C. by use of an ice bath. After the addition was complete the reaction mixture was heated to a temperature of 70° C. and maintained at that temperature until the reaction mixture became grey-green. The insolubles were removed by hot filtration and the insolubles were treated with 300 ml. of ethanol in order to solubilize any benzotriazole product contained therein. The aqueous and ethanol layers were combined and acidified with concentrated hydrochloric acid and the resultant precipitate twice recrystallized from toluene with the aid of a decolorizing agent, 50 grams of product was recovered.

EXAMPLE 2

Preparation of 2-(3-benzyl-5-chloro-2-hydroxyphenyl)-5-chlorobenzotriazole and azo intermediate 88 grams (0.5 mole) of 4-chloro-2-nitroaniline mixed with 800 ml. of water and 150 ml. of concentrated hydrochloric acid was placed in a flask and 500 grams of ice added to the mixture to lower the temperature to approximately 0° C. 34 grams (0.5 mole) of sodium nitrite dissolved in 450 ml. of water was then added to the mixture, followed by 282 ml. of 30% aqueous sodium acetate to adjust the pH to about 4. Then 109 grams (0.5 mole) of 2-benzyl-4-chlorophenol dissolved in 500 ml. of methanol and 150 grams of 30% aqueous sodium acetate were added over a period of 1½ hours while maintaining the reaction temperature at 0° C. The precipitate, which formed immediately, was filtered and washed with 600 ml. of methanol, yielding 125 grams (yield 62%) of 3-benzyl - 4',5-dichloro-2-hydroxy-2'nitroazobenzene having a m.p. 97–108° C. To a dispersion of 125 grams (0.3 mole) of the azo intermediate in 675 grams of 20% aqueous methanol in a 20% solution of sodium hydroxide (1:1 v./v. aqueous methanol NaOH solution), was added 69 grams of 97% zinc dust over a period of 15 minutes while vigorously agitating the reaction mixture and maintaining the reaction temperature at 25° C. After the initial red color dispersion turned gradually grey-green the reaction mixture was heated to 70° C. whereupon the zinc solids were removed by hot filtration. On acidification of the filtrate with concentrated hydrochloric acid, 50 grams (45% yield) of crude product was precipitated. Recrystallizing twice from toluene with the aid of a decolorizing agent yielded 21.5 grams of 2-(3-benzyl-5-chloro-2-hydroxyphenyl) - 5 - chlorobenzotriazole, m.p. 134.5–136° C.

EXAMPLE 3

Preparation of 2 - (3-*alpha*-methylbenzyl-5-chloro-2-hydroxyphenyl)benzotriazole and 3-*alpha*-methylbenzyl-5-chloro-2-hydroxy-2'-nitroazobenzene In accordance with the procedure of Examples 1 and 2 the subject compounds can be prepared by reacting o-nitroaniline, 2-*alpha*-methylbenzyl-4-chlorophenol and reduction of formed azo-intermediate.

EXAMPLE 4

Preparation of 2-(3-*alpha*-methylbenzyl-5-chloro-2-hydroxyphenyl)-5-chlorobenzotriazole and 3-*alpha*-methylbenzyl - 4',5 - dichloro - 2 - hydroxyphenyl-2'-nitroazobenzene In accordance with the procedure of Examples 1 and 2 the subject compounds are prepared by reacting p-chloro-o-nitroaniline, 2 - *alpha*-methylbenzyl-4-chlorophenol and reduction of formed azo-intermediate.

EXAMPLE 5

Employing the following formulation the benzotriazoles of Examples 1 and 2 were incorporated in a polyester resin.

Formulation

| | Parts |
|---|---|
| Laminac 4123 polyester resin * | 100 |
| Solution of cobalt naphthenate in toluene (containing 0.6% Co) | 1 |
| Stabilizer of the invention | 0.2 |
| Methyl ethyl ketone peroxide | 0.5 |

*Rigid non-promoted medium viscosity (21–27 poises, 77° F.), medium reactivity (Gel Time, 3–4½ mins.) cross-linked with styrene monomer.

The ingredients were added in the order listed mixing well after each addition. About 15 gram samples were then poured into 5 cm. aluminum cups and cured for 1 hour at room temperature and for ½ hour at 200° F. in an oven. The resulting disks, approximately ⅛ inch thick, were then placed in an Atlas Weather-Ometer, maintained at an approximate temperature of 140° F. and subjected to ultraviolet light exposure. The Weather-Ometer was operated without use of interval water sprays. The disks were removed from the Weather-Ometer at 100 hour intervals and optical transmission measured by the use of a model 610 Photometer (manufactured by the Photovolt Corporation) employing a blue filter. A blank disk containing no stabilizer and a disk stabilized with 2-(2-hydroxy-5-methylphenyl)benzotriazole a commercial stabilizer were subjected to these same conditions for comparison purposes. The results are shown below in Table I.

TABLE I

| Stabilizer | Percent optical transmission | | | | | |
|---|---|---|---|---|---|---|
| | 0 hrs. | 100 hrs. | 200 hrs. | 300 hrs. | 400 hrs. | 500 hr.s |
| Blank | 68.5 | 63 | 60.5 | 58 | 56 | 54.5 |
| Compound of— | | | | | | |
| Example 1 | 67 | 68 | 68 | 68 | 68 | 67 |
| Example 2 | 68 | 68 | 67 | 66 | 65 | 66 |
| 2-(2-hydroxy-5-methylphenyl) benzotriazole | 59.5 | 61.5 | 63 | 61 | 62 | 61.5 |

NOTE.—Underlined figures are averages of data from two tests.

From the data it can be seen that the compounds of the invention not only provide good stability but do not impart any appreciable color to the resin when merely incorporated therein. Thus the readings are almost identical to the blank before the samples are subjected to Weather-Ometer testing. The commercial compound while showing good stability does impart a considerable degree of color to the resin by its mere presence as indicated by the reading at 0 hour.

When the test is repeated employing the benzotriazole stabilizers of Example 3 and 4, the results are in substantial agreement with those of Example 1 and 2.

What is claimed is:

1. In combination: a light sensitive-polymeric composition, and an effective amount of at least about 0.01% by weight of said composition of a light-stabilizing compound to reduce the light-sensitivity of said composition without imparting any appreciable color thereto, said compound having the formula:

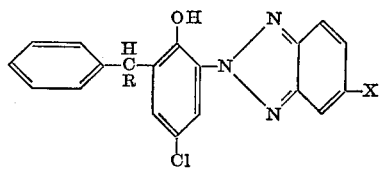

wherein R is H or methyl and X is Cl or H.

2. The combination of claim 1 wherein the light sensitive polymeric composition is an unsaturated polyester resin.

3. The combination of claim 1 wherein the light sensitive polymeric composition is a polystyrene resin.

4. The combination of claim 1 wherein the stabilizer is 2-(3-benzyl-5-chloro-2-hydroxyphenyl) benzotriazole.

5. The combination of claim 1 wherein the stabilizer is 2-(3-benzyl-5-chloro-2-hydroxyphenyl) - 5 - chlorobenzotriazole.

References Cited 878,362   9/1961   Great Britain _____ 260—308 B
119,098  12/1965   Czechoslovakia ____ 260—308 B MELVYN I. MARQUIS, Primary Examiner U.S. Cl. X.R.

260—308 B